(12) United States Patent
Reckdahl et al.

(10) Patent No.: US 6,439,507 B1
(45) Date of Patent: Aug. 27, 2002

(54) CLOSED-LOOP SPACECRAFT ORBIT CONTROL

(75) Inventors: Keith Reckdahl, Palo Alto; Birgit Sauer, Cupertino, both of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/565,836

(22) Filed: May 5, 2000

(51) Int. Cl.$^7$ .................................................. B64G 1/29
(52) U.S. Cl. ................................. 244/158 R; 244/169
(58) Field of Search ........................... 244/169, 158 R, 244/164, 172

(56) References Cited

U.S. PATENT DOCUMENTS

| | | | | |
|---|---|---|---|---|
| 3,516,623 A | * | 6/1970 | Sinden | |
| 4,767,084 A | * | 8/1988 | Chan et al. | |
| 5,054,719 A | * | 10/1991 | Maute | |
| 5,263,666 A | * | 11/1993 | Hubert et al. | |
| 5,400,252 A | * | 3/1995 | Kazimi et al. | |
| 5,687,084 A | * | 11/1997 | Wertz | |
| 5,806,802 A | * | 9/1998 | Scott | |
| 6,015,116 A | * | 1/2000 | Anzel et al. | |
| 6,032,904 A | * | 3/2000 | Hosick et al. | |
| 6,089,507 A | * | 7/2000 | Parvez et al. | |
| 6,135,394 A | * | 10/2000 | Kamel et al. | |

\* cited by examiner

Primary Examiner—Charles T. Jordan
Assistant Examiner—T. Dinh
(74) Attorney, Agent, or Firm—Kenneth W. Float

(57) ABSTRACT

A spacecraft orbit control system and method that provides orbit control of a spacecraft. The system comprises the spacecraft, one or more electric and/or chemical thrusters disposed on the spacecraft, and a control processor having control outputs coupled to the plurality of thrusters. An orbit control algorithm is implemented that determines the current orbit of the spacecraft, determines whether or not to perform stationkeeping, determines desired changes in certain orbit parameters if stationkeeping is to be performed, determines thruster firings that accomplish the desired orbit parameter changes, and fires the thrusters to perform spacecraft stationkeeping and provide spacecraft longitude control. The present invention may be used with any type of orbit determination procedure (such as GPS or ranging, with or without orbit propagation) and any type of stationkeeping algorithm that calculates thruster firings from desired orbit-parameter corrections.

18 Claims, 1 Drawing Sheet

CLOSED-LOOP SPACECRAFT ORBIT CONTROL

BACKGROUND

The present invention relates generally to spacecraft attitude control systems and methods, and more particularly, to a closed loop spacecraft orbit control system and method.

The assignee of the present invention manufactures and deploys spacecraft that orbit the Earth. Most conventional longitude control schemes perform longitude control when the longitude error reaches a threshold value. It would be desirable to improve upon the control capability of conventional longitude control schemes.

More particularly, in the current state-of-the-art, orbit control is accomplished by monitoring orbit error and then performing maneuvers whenever the orbit errors exceed a predetermined threshold. This results in stationkeeping maneuvers that are performed weeks apart from each other. However, when developing stationkeeping strategies that use electric thrusters, it was discovered that the heritage method used by the assignee of the present invention had several shortcomings.

First, to minimize the size of solar arrays and spacecraft batteries, it was necessary to perform electric thruster stationkeeping daily. Also, since electric thrusters provide a lower thrust than conventional bipropellant thrusters, daily maneuvers were also needed to prevent long-duration maneuvers whose thrust is applied far from the orbital node which would decrease stationkeeping efficiency. Therefore, stationkeeping was performed at irregular predetermined times instead of when a threshold was tripped.

Initially, it was anticipated that daily stationkeeping could be accommodated by abandoning the heritage thresholds and performing equal amounts of orbital correction every day. While such daily stationkeeping planning performed well when the only disturbances were natural highly-predictable disturbances, it was discovered that unpredictable orbital disturbances caused daily stationkeeping planning to be performed poorly.

In particular, the electric thruster stationkeeping introduced several new disturbances to the orbit. First, to prevent the electric thruster plume from degrading the surface of the solar array, the electric thrusters were angled away from the orbit normal, introducing a radial component which affects the orbit longitude. This radial thrust produces a longitudinal shift which is compensated for by increasing the size of the orbit (above synchronous). Since the location and duration of north-south burns change over the seasons, the effects of these radial disturbances continually change and thus the necessary orbital size continually changes. Second, since the electric thrusters were gimbaled to allow momentum dumping (as described in U.S. Pat. No. 5,349,532, for example), the gimbaling changed the thruster vector direction, introducing a disturbance to the orbit. Third, the enlarged orbit resulted in a reversed longitudinal shift if the north-south burns were bypassed for a day to accommodate ranging or other satellite operations.

It is therefore an objective of the present invention to provide for an improved closed loop spacecraft orbit control system and method that improves upon conventional systems and methods.

SUMMARY OF THE INVENTION

To accomplish the above and other objectives, the present invention provides for a closed loop spacecraft orbit control system and method that provides improved orbit control of a spacecraft. An exemplary orbit control scheme implemented in the system and method comprises the following steps.

The current orbit of the spacecraft is determined. From this orbit and a control orbit, desired changes of orbit parameters are determined. Thruster firings that accomplish the desired orbit parameter changes are then determined by adding the expected orbital disturbance (if any) to a sum of terms proportional to the orbital errors. The thrusters are then fired to perform spacecraft stationkeeping and provide spacecraft orbit control.

The present invention may be used with any type of orbit determination procedure (such as using inputs derived from a global positioning system (GPS) receiver or from ranging techniques) and any type of stationkeeping algorithm that calculates thruster firings from desired orbit-parameter corrections.

The present invention thus provides for a compensation system or compensator that implements closed-loop control of the orbit parameters of a spacecraft. Since the compensator requires very few computations, it can be performed either on-board the spacecraft or in ground-based software. While conventional orbit control systems and methods perform orbit control when the orbital parameter errors reaches a threshold value, the present invention performs orbit control at regular, predetermined times.

Performing longitude control at regular times allows the longitude of the spacecraft to be controlled to tighter values. Using a linear feedback control law makes the control system and method more robust to unmodeled disturbances and improves the control stability.

The present invention preferably uses discrete linear-feedback control to determine the amount of orbit-parameter correction. The calculation of orbit-parameter correction is separated from the calculation of thruster forces or other actuation, allowing the present invention to used with any stationkeeping algorithm that calculates thruster firings from desired orbit-parameter changes.

It is worth noting that another possible method for orbit maintenance is described in U.S. Pat. Nos. 5,528,502 and 5,687,084. Since the method outlined in these patents relies on atmospheric drag experienced by low-earth satellites to greatly simplify the problem, it cannot be used on geosynchronous satellites, which experience no appreciable atmospheric drag. In particular, the presence of atmospheric drag allows the method to know the necessary direction of actuation, the location in the orbit at which to maneuver, and most importantly, adds a large amount of damping to the system. Since geosynchronous spacecraft experience no natural damping, a method for geosynchronous orbital maintenance must correct for orbital errors while also eliminating any oscillations. Since the present invention can function well regardless of the presence or absence of atmospheric drag, the present invention is suitable for orbits of any kind.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
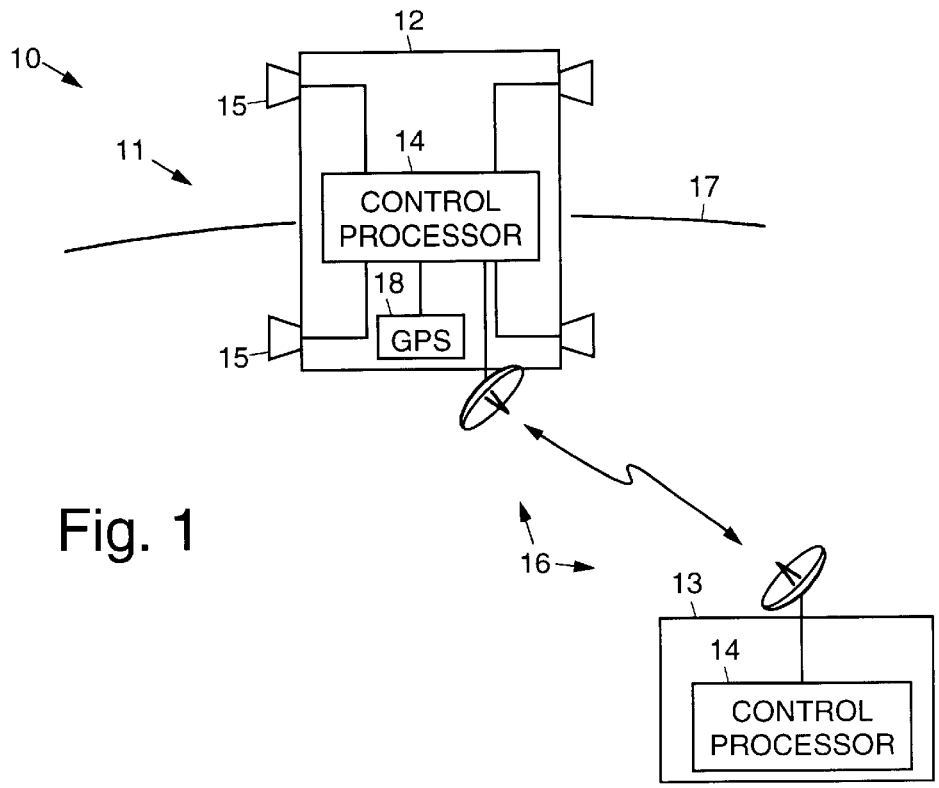
FIG. 1 illustrates an exemplary closed loop spacecraft longitude control system in accordance with the principles of the present invention.

Referring to the drawing figures, FIG. 1 illustrates an exemplary closed loop spacecraft longitude control system 10 in accordance with the principles of the present invention. The exemplary closed loop spacecraft longitude control system 10 provides for an orbit compensator 11 that implements a stationkeeping algorithm that may be used on a spacecraft 12 or at a ground station 13.

In developing the present invention, it was determined that a stationkeeping algorithm was needed that may be performed at regular intervals, that compensates for uncertainty in disturbances, and that adjusts for changing conditions. It was discovered that the application of discrete linear-feedback control could be used to determine the amount of orbit-parameter correction for daily stationkeeping of the spacecraft 12 using electric thrusters 15.

The exemplary closed loop spacecraft longitude control system 10 and orbit compensator 11 comprises a control processor 14 that may be disposed on the spacecraft 12 or at the ground station 13. When the control processor 14 is disposed on the spacecraft 12, it has control outputs that are coupled to a plurality of electric thrusters 15. However, it is to be understood that a chemical thrusters 15 or a combination of electric and chemical thrusters 15 may be employed depending upon the spacecraft 12. When the control processor 14 is disposed at the ground station 13, the output of the processor 14 is uplinked to the control processor 14 on the spacecraft 12 by way of a communications link 16 which in turn actuates the electric thrusters 15.

The control processor 14, whether it is disposed on the spacecraft 12 or is located at the ground station 13 implements the following algorithm. The current orbit 17 of the spacecraft 12 is determined. A determination is then made whether or not to perform stationkeeping. If stationkeeping is to be performed, desired changes in certain orbit parameters are determined. Thruster firings that accomplish the desired orbit parameter changes are then determined. The control processor 14 then actuates the electric thrusters 15 to perform spacecraft stationkeeping and in particular provide spacecraft longitude control.

Advantages of the orbit compensator 11 is best demonstrated by control of mean longitude control, since mean longitude is governed by a second-order differential equation. Since the mean longitude $\lambda$ cannot be immediately changed and thus must be changed by adjusting the semi-major axis a, which is equivalent to adjusting $\lambda$, which is the time derivative of the spacecraft longitude.

A spacecraft 12 in a circular geosynchronous orbit is exposed to three in-plane disturbances that affect mean longitude: (1) a constant acceleration $f_{drift}$ (either eastward or westward, primarily due to the earth's triaxiality), (2) a twice-daily velocity change of $\pi^* f_{drift}/\omega_0$ to compensate for the acceleration (in the opposite direction from the acceleration), and (3) a daily radial velocity change of $\Delta V_{RAD}$ towards earth (half of which is performed in each of two maneuvers 12 hours apart). Assuming for these purposes that the acceleration is eastward (and the velocity change is therefore westward), the satellite experiences a daily eastward longitudinal shift of $$\Delta \lambda = \frac{2}{a\omega_0} \Delta V_{RAD} + \frac{3\pi^2}{a\omega_0} f_{drift} \qquad (1)$$

where a is the spacecraft's semi-major axis and $/\omega_0$ is the geosynchronous orbital rate.

However, this longitudinal shift can be decreased if the altitude of the spacecraft is increased to be supersynchronous. If the spacecraft's semi-major axis is increased to $$a_{SS} = R_{GEO} + \frac{2}{3\pi\omega_0} \Delta V_{RAD} + \frac{\pi}{\omega_0^2} f_{drift} \qquad (2)$$

then the longitudinal shift can be eliminated altogether. This means that if the disturbances are known perfectly and the thrusters 15 produce exactly the desired forces, the spacecraft with semi-major axis in equation (2) will keep its mean longitude at the desired longitudinal location. However, since the disturbances are not known perfectly, a spacecraft 12 whose initial semi-major axis is given by equation (2) will be disturbed from the desired longitude due to unmodeled disturbances. The time it takes for the spacecraft 12 to depart from the desired mean longitude can be increased by improving the modeling of the spacecraft disturbances. However, such improved modeling increases the computational burden and still does not eliminate the departure from the desired longitude.

The departure from desired mean longitude can be eliminated by having the daily stationkeeping produce an orbital change equal and opposite to the orbital error. While this performs better than the other methods, it is still sensitive to orbit determination error and at times exhibited oscillatory behavior.

The present invention uses the compensator 11 to eliminate the departure from the desired mean longitude while avoiding the above problems. The compensator 11 uses the following equation to determine the $\Delta a/a$ adjustment necessary to correct a $\lambda$ error and/or an a error:

$$\frac{\Delta a}{a} = \frac{\Delta a}{a}\bigg|_{NOM} + K_1(a - a_{SS}) + K_2(\lambda - \lambda_{DES}) \qquad (3)$$

where $\lambda_{DES}$ is the desired station longitude and $a_{SS}$ is the steady-state semi-major axis given by equation (2), and the nominal amount of $\Delta a/a$ correction is given by $$\frac{\Delta a}{a}\bigg|_{NOM} = = \frac{-4\pi}{a_{SS}\omega_0^2} f_{drift}. \qquad (4)$$

The values of $K_1$ and $K_2$ in equation (3) cannot be chosen arbitrarily, as their values determine the manner in which the longitudinal errors are eliminated. If $K_1$ and $K_2$ are not chosen properly, equation (3) can be unstable, leading to growing longitudinal errors. If the values of $K_1$ and $K_2$ are determined by $$K_1 = \frac{-3 - d_1 + d_0}{2a_{SS}} \qquad (5)$$

$$K_2 = \frac{1 + d_1 + d_0}{3\pi} \qquad (6)$$

where the desired error dynamics are given by the following discrete characteristic equation:

$$Z^2 + d_1 z + d_0 = 0 \qquad (7)$$

When the desired error dynamics have a natural frequency of $\omega_N$ and a damping ratio of $\zeta$, the constants $d_1$ and $d_0$ can be calculated by the following set of equations $$\sigma = \zeta \omega_n \qquad (8)$$

$$\omega_D = \omega_N \sqrt{1-\zeta^2} \quad (9)$$

$$d_1 = -2e^{-\sigma 1} \cos(\omega_n T) \quad (10)$$

$$d_0 = e^{-2\sigma 1} \quad (11)$$

where T is the sampling period of one day.

The values for $K_1$ and $K_2$ in equations (5–6) were determined by first constructing a set of difference equations for the orbital dynamics for the system $$\lambda_{K+1} = \lambda_K + \dot\lambda_K T - 1.5\pi\Delta\frac{a}{a} \quad (12)$$

$$\dot\lambda_{K+1} = \dot\lambda_{K+1} - \frac{3\pi}{T}\Delta\frac{a}{a} \quad (13)$$

where T is the sampling time of one day. The characteristic equation for this system with the control given in equation (3) is then equated with the desired characteristic equation given in equation (7) to produce the values of $K_1$ and $K_2$ in equations (5) and (6).

Due to unmodelled disturbances and changing disturbances, the actual values for $a_{SS}$ and $\Delta a/a|_{NOM}$ will differ from those in equations (2) and (4). The control law in equation (3) will compensate for these differences to keep the longitude error small. However, any constant error in these terms or any other constant disturbance will lead to a steady-state mean longitude error. This steady-state error can be lessened by increasing the value of $\omega_N$ but this has some unwanted side effects such as increased sensitivity to orbit-determination error and other disturbances.

A better method for eliminating steady-state mean longitude error is to modify the control law in equation (3) to include integral control $$\frac{\Delta a}{a} = \frac{\Delta a}{a}\Big|_{NOM} + K_1(a-a_{SS}) + K_2(\lambda-\lambda_{DES}) + K_3(\lambda-\lambda_{DES}) \quad (14)$$

Where $(\lambda-\lambda_{DES})$ is the summation of the daily mean longitude errors. The feedback gains $K_1$, $K_2$, $K_3$ are determined by $$K_1 = \frac{-7 - d_2 + d_1 - d_0}{4a_{SS}} \quad (15)$$

$$K_2 = \frac{3 + d_2 - d_1 - 3d_0}{6\pi} \quad (16)$$

$$K_3 = \frac{1 + d_2 + d_1 - d_0}{3\pi} \quad (17)$$

where the desired characteristic equation is $$z^3 + d_2 z^2 + d_1 z + d_0 = 0. \quad (18)$$

When the desired error dynamics is described by three poles with natural frequency of $\omega_N$, two of which having a damping ratio of $\zeta$ and the third having critical damping, then the constants $d_2$, $d_1$ and $d_0$ can be calculated by the following set of equations $$\sigma = \zeta\omega_N \quad (19)$$

$$\omega_D = \omega_N\sqrt{1-\zeta^2} \quad (20)$$

$$d_2 = -e^{-\omega_N T} - 2e^{-\sigma T}\cos(\omega_D T) \quad (21)$$

$$d_1 = e^{-2\sigma T} + 2e^{-(\sigma+\omega_N)T}\cos(\omega_D T) \quad (22)$$

$$d_0 = -e^{-(\omega_N + 2\sigma)T} \quad (23)$$

If the desired error dynamics is instead described by a third-order ITAE prototype with natural frequency of $\omega_N$ then the constants $d_2$, $d_1$ and $d_0$ can be calculated by the following set of equations $$d_2 = -e^{-0.7081\omega_N T} - 2e^{-0.521\omega_N T}\cos(1.068\omega_N T) \quad (24)$$

$$d_1 = e^{-1.042\omega_N T} + 2e^{-1.2291\omega_N T}\cos(1.068\omega_N T) \quad (25)$$

$$d_0 = -e^{-1.7501\omega_N T} \quad (26)$$

The orbit compensator 11 can also be applied to those orbit parameters that are not governed by second-order difference equations. For example, instead of calculating the desired inclination change $\Delta i$ by $$\Delta i = i - i_{SS} \quad (27)$$

This invention calculates $\Delta i$ by $$\Delta i = \Delta i_{NOM} - K(i - i_{SS}) \quad (28)$$

where $\Delta i_{NOM}$ is the nominal inclination change, $i_{SS}$ is the steady-state inclination, and K is a feedback gain chosen to achieve the desired rate of inclination-error decay. An advantage of equation (13) over equation (12) is that it is less sensitive to orbit-determination error. Furthermore, if stationkeeping is not performed during one or more cycles, the resulting large inclination error is subsequently corrected over multiple stationkeeping periods.

An added benefit of an orbit controller is that one can tailor its response to disturbances of different harmonics. If tracking high-frequency disturbances results in larger propellant consumption, the controller response to such frequencies can be lessened in order to save propellant. This can be achieved by adjusting the gains (such as $K_1$ and $K_2$ in equation (3) or K in equation 28) or adding a filter to provide the desired frequency response.

Since the present invention requires knowledge of the current orbit 17, an orbit-determination procedure is required. Examples of orbit-determination procedures are (1) estimating the orbit using ranging data and an orbit propagator (either with or without propagating the orbit through the maneuvers), or (2) using a GPS (global positioning system) receiver or GPS-like system to determine the orbit.

The present invention thus uses discrete linear-feedback control to determine the amount of orbit-parameter correction necessary to provide daily electric thruster stationkeeping. The present invention separates the calculation of orbit-parameter correction from the calculation of thruster forces or other actuation. This allows the present invention to be used with any stationkeeping algorithm that calculates thruster firings from desired orbit-parameter changes. A preferred embodiment of the present invention calculates thruster firings from desired orbit-parameter changes as described in the paper "A Practical Stationkeeping Method for Modular Geosynchronous Satellites with Xenon Propulsion System" by Kamel, Gelon, and Reckdahl (paper AAS 99-388, AAS/AIAA Astrodynamics Specialist Conference, Girdwood, Ak., Aug. 16–19, 1999).

Although the description hereinabove details the control of mean longitude, the present invention may similarly be applied to other orbit parameters, with closed-loop control of the other orbit parameters yielding advantages such as lessened impact of orbit-determination noise and better control of steady-state offsets, even without accurate knowledge of feedforward terms.

Figure 2:
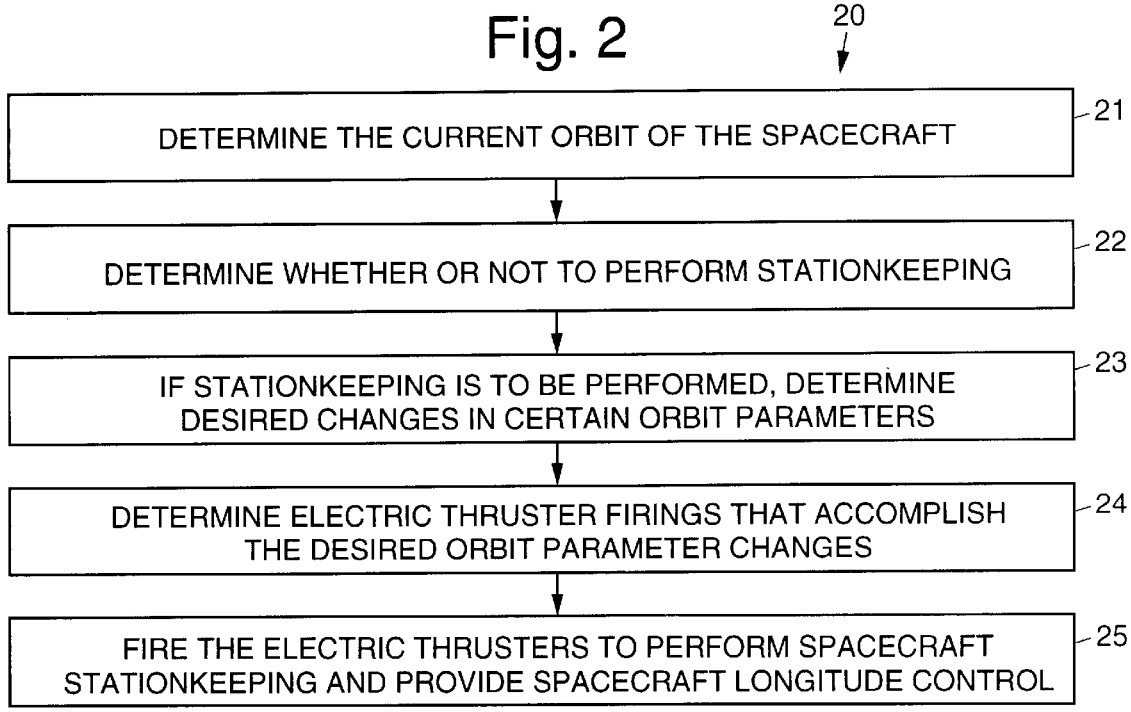
FIG. 2 illustrates an exemplary closed loop spacecraft longitude control method in accordance with the principles of the present invention.

Referring now to FIG. 2, it illustrates an exemplary closed loop spacecraft orbit control method 20 in accordance with the principles of the present invention. The exemplary closed loop spacecraft orbit control method 20 comprises the following steps.

The current orbit 17 of the spacecraft 12 is determined 21. A determination is then made 22 whether or not to perform stationkeeping. If stationkeeping is to be performed, desired changes in certain orbit parameters are determined 23. Electric thruster firings that accomplish the desired orbit parameter changes are then determined 24. The electric thrusters are then fired 25 to perform spacecraft stationkeeping to provide spacecraft longitude control.

The system 10 and method 20 may be used with any type of orbit determination procedure and any type of stationkeeping algorithm that calculates thruster firings from desired orbit-parameter corrections.

Thus, a closed loop spacecraft longitude control system and method have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A closed loop spacecraft orbit control system for use with a geosynchronous satellite, comprising:

a geosynchronous spacecraft;

a plurality of thrusters disposed on the geosynchronous spacecraft; and a control processor having control outputs coupled to the plurality of thrusters that at substantially regular intervals determines the current orbit of the geosynchronous spacecraft, determines whether or not to perform stationkeeping, uses a linear feedback control law to determine desired changes in certain orbit parameters if stationkeeping is to be performed, determines thruster firings that accomplish the desired orbit parameter changes, and fires the thrusters to perform spacecraft stationkeeping and provide spacecraft orbit control.

2. The system recited in claim 1 wherein the plurality of thrusters comprises a plurality of electric thrusters.

3. The system recited in claim 1 wherein the plurality of thrusters comprises a plurality of chemical thrusters.

4. The system recited in claim 1 wherein the plurality of thrusters comprises a plurality of electric and chemical thrusters.

5. The system recited in claim 1 wherein the control processor is disposed on the spacecraft.

6. The system recited in claim 1 wherein the control processor is located at a ground station and the output of which is uplinked to the spacecraft by way of a communications link.

7. The system recited in claim 1 wherein the control processor determines the current orbit of the spacecraft using a global positioning system (GPS) receiver.

8. The system recited in claim 1 wherein the control processor determines the current orbit of the spacecraft using a ranging technique.

9. The system recited in claim 1 wherein the spacecraft is in an orbit that is substantially geosynchronous and wherein the orbit parameter that is controlled is the spacecraft's mean longitude.

10. A closed loop geosynchronous spacecraft longitude control method comprising the steps, performed at substantially regular intervals, of:

determining the current orbit of a geosynchronous spacecraft;

determining whether or not to perform stationkeeping;

if stationkeeping is to be performed, using a linear feedback control law to determine desired changes in certain orbit parameters;

determining thruster firings that accomplish the desired orbit parameter changes; and firing one or more thrusters to perform spacecraft stationkeeping and provide spacecraft longitude control.

11. The method recited in claim 10 wherein the one or more thrusters comprise electric thrusters.

12. The method recited in claim 10 wherein the one or more thrusters comprise chemical thrusters.

13. The method recited in claim 10 wherein the one or more thrusters comprise electric and chemical thrusters.

14. The method recited in claim 10 which is implemented on the spacecraft.

15. The method recited in claim 10 which is implemented at a ground station and whose control outputs are uplinked to the spacecraft by way of a communications link.

16. The method recited in claim 10 wherein the current orbit of the spacecraft is determined using a global positioning system (GPS) receiver.

17. The method recited in claim 10 wherein the current orbit of the spacecraft is determined using a ranging technique.

18. The method recited in claim 10 wherein the spacecraft is in an orbit which is substantially geosynchronous and the orbit parameter that is controlled is the spacecraft's mean longitude.

* * * * *